(12) United States Patent
Rogers, Jr. et al.

(10) Patent No.: US 6,378,909 B1
(45) Date of Patent: Apr. 30, 2002

(54) DISCONNECT/RECONNECT TOOL FOR A HOSE COUPLING

(75) Inventors: Leslie Nicholas Rogers, Jr., Kingston; Barry Scott Stout, Rockwood, both of TN (US)

(73) Assignee: Dover Capital Formation Corporation, Wilmington, DE (US)

( * ) Notice: Subject to any disclaimer, the term of this patent is extended or adjusted under 35 U.S.C. 154(b) by 0 days.

(21) Appl. No.: 09/605,314

(22) Filed: Jun. 28, 2000

(51) Int. Cl.[7] ............................................... F16L 35/00
(52) U.S. Cl. ............................................ 285/39; 285/1
(58) Field of Search ......................... 285/39, 1; 29/237, 29/257

(56) References Cited

U.S. PATENT DOCUMENTS

| | | | |
|---|---|---|---|
| 713,189 A | 11/1902 | Yates | |
| 753,456 A | 3/1904 | Weidinger | |
| 807,315 A | 12/1905 | Perron | |
| 869,527 A | 10/1907 | Shears | |
| 1,019,605 A | 3/1912 | Cummings | |
| 3,176,551 A | 3/1962 | Hansen | |
| 3,192,805 A | 7/1965 | Manning | |
| 3,299,496 A | 1/1967 | Christensen | |
| 3,722,065 A | 3/1973 | Harris | |
| 3,726,122 A | 4/1973 | Dawson | |
| 3,727,289 A | * 4/1973 | Bemelmann et al. | ......... 29/237 |
| 3,845,538 A | 11/1974 | Demler, Sr. | |
| 3,977,066 A | * 8/1976 | Sands et al. | .................. 29/237 |
| 4,170,125 A | 10/1979 | Minka | |
| 4,257,135 A | 3/1981 | Moebius | |
| 4,305,438 A | * 12/1981 | Spinosa et al. | ............... 141/98 |
| 4,483,056 A | 11/1984 | Schwalm et al. | |
| 4,649,614 A | 3/1987 | Lund | |
| 4,757,588 A | 7/1988 | Churchich | |
| 4,769,889 A | * 9/1988 | Landman et al. | ............. 29/237 |
| 4,893,393 A | 1/1990 | Marshall | |
| 5,048,169 A | 9/1991 | Beggiato | |
| 5,115,836 A | 5/1992 | Carow et al. | |
| 5,209,262 A | 5/1993 | Carow et al. | |
| 5,367,756 A | 11/1994 | Huetinck | |
| 5,513,838 A | 5/1996 | Van Rossum | |
| 5,566,438 A | 10/1996 | Bullock | |
| 5,570,719 A | 11/1996 | Richards et al. | |
| 5,586,378 A | 12/1996 | Smith | |
| 5,802,690 A | 9/1998 | Bullock | |
| 5,893,201 A | 4/1999 | Myers | |
| 5,979,032 A | 11/1999 | Roy et al. | |
| 6,016,597 A | 1/2000 | Clemons | |
| 6,050,608 A | * 4/2000 | Hattori et al. | ................ 285/39 |

* cited by examiner

Primary Examiner—Paul N. Dickson
Assistant Examiner—Xuan Lan Nguyen
(74) Attorney, Agent, or Firm—Pitts & Brittian, P.C.

(57) ABSTRACT

A disconnect/reconnect tool (10) for selectively disconnecting and reconnecting the coupling components of a hose coupling (12). The disconnect/reconnect tool (10) includes a body (28) provided with a threaded bore (36), and a threaded shaft (38) for being threadably received in the threaded bore (36). The threaded shaft (38) defines a proximal end portion which carries a first engaging member (40) for releasably engaging a first coupling component (14) of a hose coupling (12). The disconnect/reconnect tool (10) also includes a second engaging member (54) carried by the body (28) for releasably engaging a second coupling component (16) of the coupling (12), whereby selective rotation of the threaded shaft (38) in a first rotational direction applies disengaging force in excess of the preselected value to the first and second coupling components (14 and 16) thereby disconnecting the coupling components, and selective rotation of the threaded shaft in a second rotational direction applies engaging force to the first and second coupling components (14 and 16) sufficient to reconnect the coupling components of the hose coupling (12).

17 Claims, 4 Drawing Sheets

DISCONNECT/RECONNECT TOOL FOR A HOSE COUPLING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to a disconnect/reconnect tool for selectively disconnecting and reconnecting the coupling components of a hose coupling, such as a breakaway hose coupling used in connection with fuel dispensing hoses and nozzles.

2. Description of the Related Art

Filling stations for dispensing gasoline and other fuels have long had a problem with vehicles pulling away from fuel dispensing pumps with the dispensing nozzle still inserted in the vehicle's tank, or with the nozzle or dispensing hose otherwise secured or hung on the vehicle. To obviate this problem, filling stations use breakaway hose couplings which are generally placed between the dispensing nozzle and dispensing hose, or between segments of dispensing hose. The breakaway hose couplings typically comprise two coupling components which are selectively engagable to establish fluid communication through the coupling, with valve mechanisms being mounted in each coupling component for selectively terminating the flow of fuel through each component when the components are disengaged. An automatic disconnect mechanism is also provided for maintaining the coupling components in an engaged position in absence of a disengaging force in excess of a preselected value, and for disengaging the first and second coupling components in response to a disengaging force in excess of such preselected value. Examples of such breakaway hose couplings are disclosed in U.S. Pat. Nos. 5,209,262 and 5,115,836.

Whereas breakaway hose couplings have been useful in preventing damage to dispensing pumps, difficulty can be encountered in disconnecting and reconnecting such breakaway hose couplings. In this regard, due to the requirement that a breakaway coupling remain coupled when forces associated with normal fuel dispensing conditions are applied, and due to the need to avoid inadvertent disconnection of the coupling, the force necessary to disconnect or reconnect the coupling is significant. Accordingly, the manual disconnecting and reconnecting of the coupling can require significant strength. U.S. Pat. Nos. 5,566,438 and 5,802,690 disclose various embodiments of a tool for reconnecting a breakaway hose coupling, but such tools utilize a channel lock pliers configuration which is not particularly efficient in applying the axial disconnect force, and reconnect force, desired. Whereas the use of such channel lock configuration does offer some mechanical advantage over manually reconnecting the coupling, significant force must still be applied to the handles of the tool. Further, the tools disclosed in U.S. Pat. Nos. 5,566,438 and 5,802,690 are not suitable for use with breakaway couplings which incorporate a swivel mechanism, such as the coupling disclosed in U.S. Pat. No. 5,570,719.

Other tools which are know to the inventors are disclosed in U.S. Pat. Nos. 6,016,597; 5,979,032; 5,893,201; 5,802,690; 5,586,378; 5,566,438; 5,513,838; 5,367,756; 5,048,169; 4,893,393; 4,757,588; 4,649,614; 4,483,056; 4,257,135; 4,170,125; 3,845,538; 3,726,122; 3,722,065; 3,299,496; 3,192,805; 3,176, 551; 1,019,605; 869,527; 807,315; 753,456; and 713,189.

It is therefore an object of the present invention to provide a disconnect/reconnect tool for selectively disconnecting and reconnecting the coupling components of a hose coupling.

It is also an object of the present invention to provide a disconnect/reconnect tool for selectively disconnecting and reconnecting the coupling components of a breakaway hose coupling, such as the couplings commonly used in conjunction with the dispensing of fuel.

Another object of the present invention to provide a disconnect/reconnect tool for selectively disconnecting and reconnecting the coupling components of a breakaway hose coupling which is easy to use, and which applies substantially axial disconnect/reconnect force which is not damaging to the breakaway coupling.

Yet another object of the present invention is to provide a disconnect/reconnect tool for selectively disconnecting and reconnecting the coupling components of a breakaway hose coupling which incorporates a swivel mechanism.

Other objects and advantages over the prior art will become apparent to those skilled in the art upon reading the detailed description together with the drawings as described as follows.

BRIEF SUMMARY OF THE INVENTION

The present invention provides a disconnect/reconnect tool for selectively disconnecting and reconnecting the coupling components of a hose coupling. The disconnect/reconnect tool includes a body which defines first and second leg portions, with the first leg portion having a distal end portion which is provided with a threaded bore. The threaded bore is receptive of a threaded shaft which is capable of reciprocating axial movement within the bore as a result of selective rotation of the shaft.

The threaded shaft defines a proximal end portion which is provided with a first engaging member for releasably engaging the first coupling component. The second leg portion of the body defines a second engaging member for releasably engaging the second coupling component. In a preferred embodiment of the tool, the second engaging member defines a slot which is releasably receptive of the second coupling component, with the slot being angularly disposed to engage the second coupling component proximate the point of swivel engagement of a valve housing and elbow portion of the second coupling component.

In order to disconnect a coupling using the disconnect/reconnect tool the first engaging member is positioned to engage the first coupling component and such that it is capable of abutting the hose fitting of the hose or other dispensing device on which the first coupling component is mounted. The second engaging member is positioned such that at least a portion of the second coupling component is received in the slot of the second engaging member. With the tool so positioned, selective rotation of the threaded shaft in a first rotational direction brings the first engaging member into contact with the hose fitting and the sidewall of the slot of the second engaging member into contact with the second coupling component, thereby exerting a disengaging force on the coupling for disconnecting the coupling components. In order to use the tool to reconnect the coupling, the first and second coupling components are aligned for reconnecting, and the tool is positioned as described above with respect to the disconnection operation. With the tool so positioned, selective rotation of the threaded shaft in a second rotational direction exerts a reconnecting force on the coupling for reconnecting the coupling the coupling components.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A disconnect/reconnect tool constructed in accordance with the present invention is illustrated generally as 10 in the figures. The tool of the present invention is used for selectively disconnecting and reconnecting the coupling components of a hose coupling, such as the breakaway hose couplings disclosed in U.S. Pat. Nos. 5,209,262 and 5,115,836. Such breakaway hose couplings are used for releasably joining two fuel dispensing devices in fluid communication, and for selectively disengaging such dispensing devices in response to a disengaging force in excess of a preselected value being exerted on the coupling.

Figure 4:
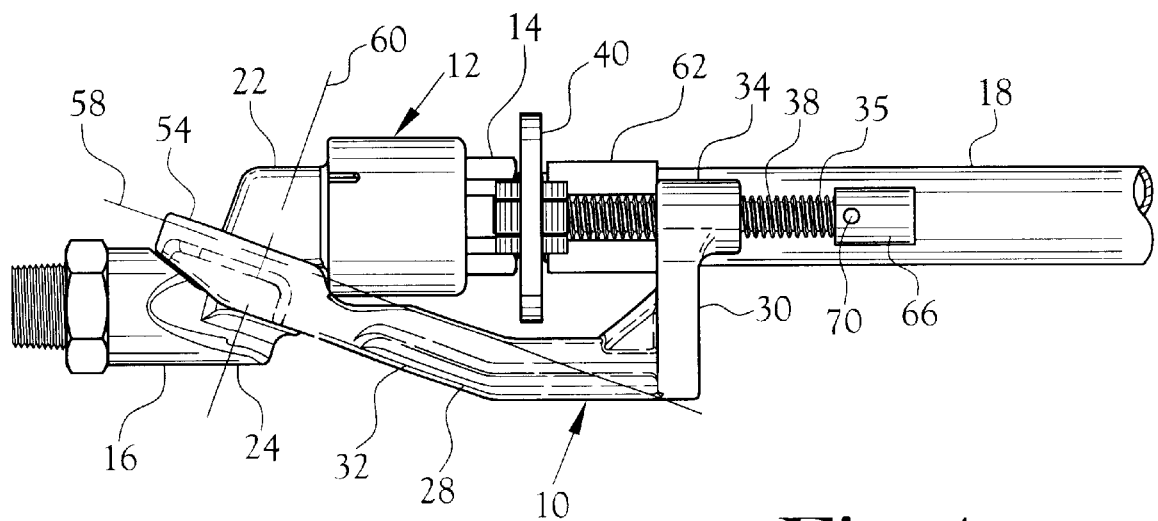
FIG. 4 illustrates a side elevation view of a disconnect/reconnect tool of the present invention as it engages a hose coupling.
Figure 5:
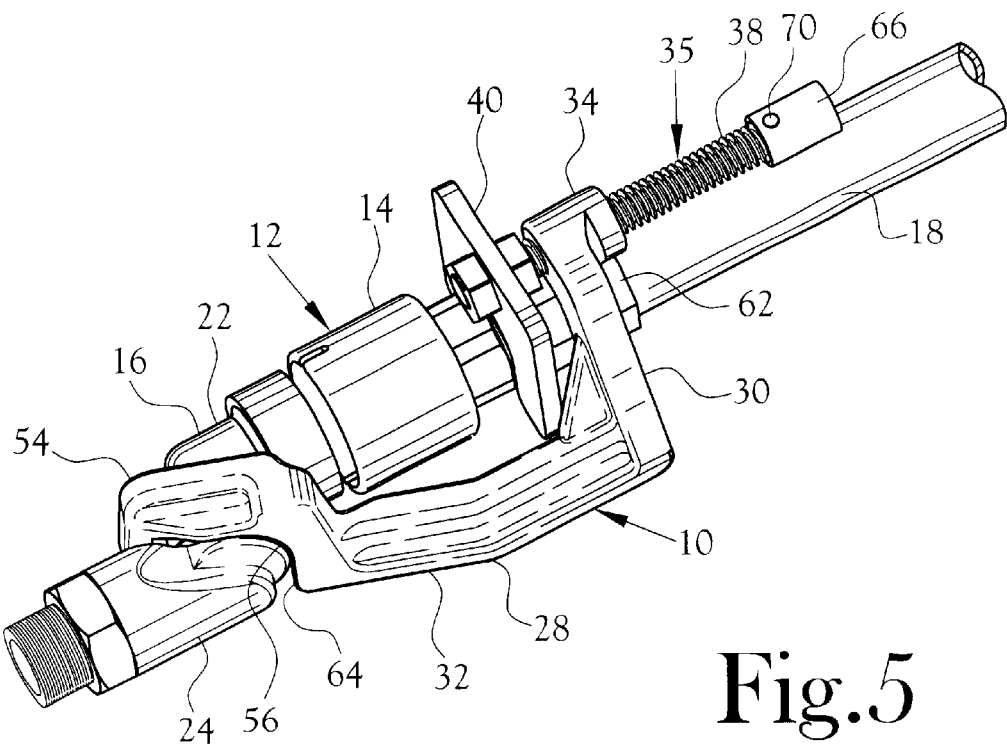
FIG. 5 illustrates a perspective view of a disconnect/reconnect tool of the present invention as it engages a hose coupling.

For the purpose of illustrating the operation of the tool 10, an example of a breakaway hose coupling is illustrated at 12 in FIGS. 4 and 5. The coupling 12 includes first and second coupling components 14 and 16, respectively, for being placed in flow-through fluid communication with first and second dispensing device, such as the dispensing hose 18 and a dispensing nozzle (not shown), with the coupling components 14 and 16 being selectively engagable to establish fluid communication there between. Valve mechanisms (not shown) are mounted in fuel passageways (not shown) in each of the coupling component 14 and 16 for selectively terminating the flow of fuel through such fuel passageways when the coupling components 14 and 16 disengage. An automatic disconnect mechanism (not shown) is also provided for maintaining the first and second coupling components 14 and 16 in an engaged position in absence of a disengaging force in excess of a preselected value, and for disengaging the first and second coupling components 14 and 16 in response to a disengaging force in excess of such preselected value. In this particular exemplary embodiment of a breakaway hoses coupling, the second coupling component 16 further incorporates valve housing 22 and an elbow portion 24, and incorporates a swivel connecting mechanism (not shown) for pivotally securing the elbow portion 24 to the valve housing 22, whereby the elbow portion 24 selectively swivels with respect to the valve housing 22.

It is noted that the coupling 12 is illustrated and described herein merely to aide in explaining the operation of the tool 10, and it will be understood by those of ordinary skill in the art that the tool 10 can be used for disconnecting and reconnecting various different hose couplings.

As illustrated in the Figures, the disconnect/reconnect tool 10 includes a body 28 which is preferably fabricated of a strong durable material such as steel. In the preferred illustrated embodiment, the body 28 defines first and second leg portions 30 and 32, respectively, with the first leg portion 30 defining a distal end portion 34 which carries an axially reciprocating actuator mechanism 35. More specifically, in the preferred embodiment the distal end portion 34 of the first leg portion 30 is provided with a threaded bore 36. The threaded bore 36 is receptive of a threaded shaft 38 which is capable of reciprocating axial movement within the bore 36 as a result of selective rotation of the shaft 38.

Figure 3:
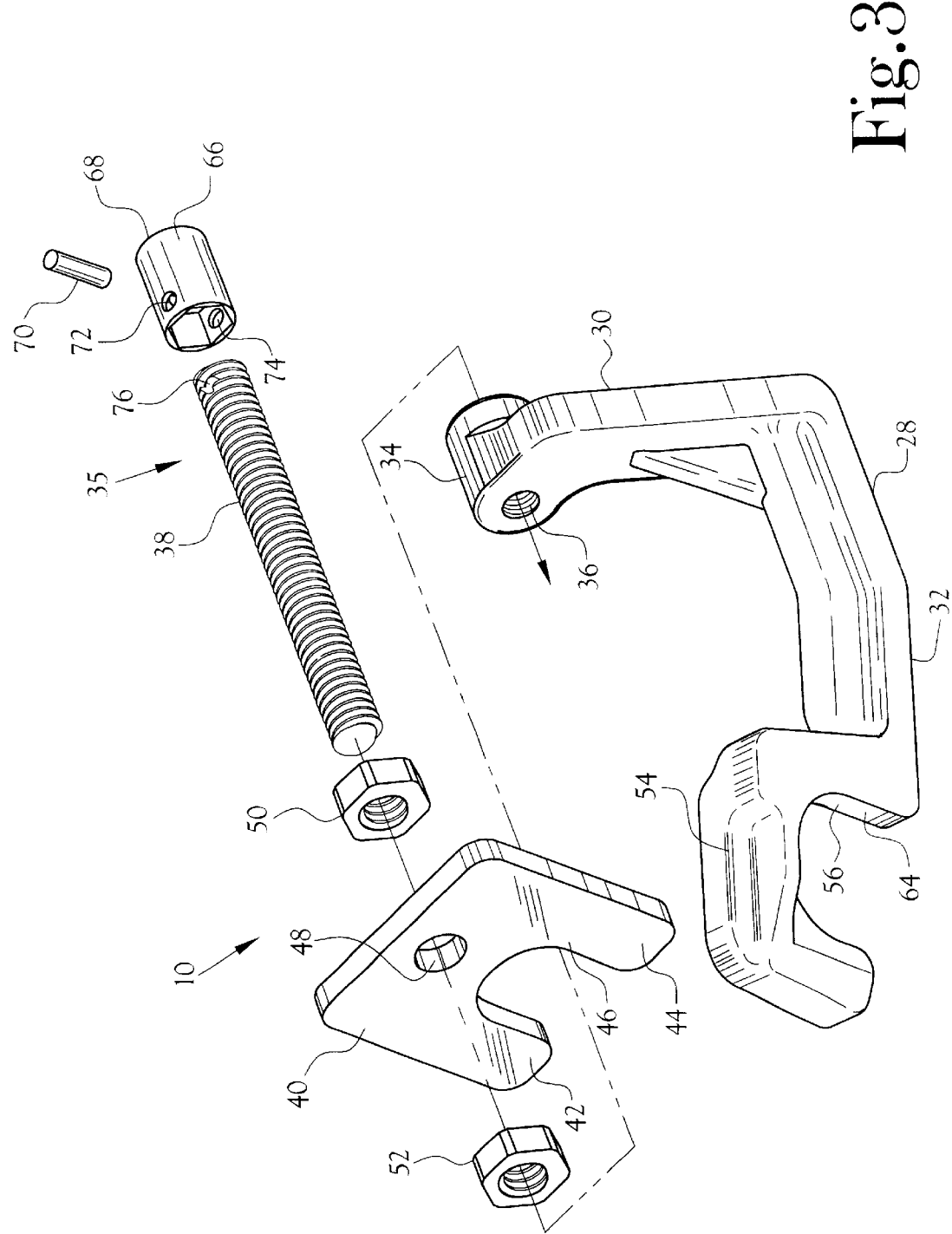
FIG. 3 illustrates an exploded perspective view of a disconnect/reconnect tool of the present invention.

The threaded shaft 38 defines a proximal end portion which is provided with a first engaging member 40 for releasably engaging the first coupling component 14. In the preferred embodiment of the tool 10, the first engaging member 40 defines a U-shaped member defining parallel arms 42 and 44 and a slot 46 which is releasably receptive of the first coupling component 14. As best illustrated in FIG. 3, the first engaging member 40 is rotatably secured to the threaded shaft 38 such that rotation of the shaft 38 can be effected notwithstanding the engagement of the first engaging member 40 with the first coupling component 14. In this regard, the first engaging member 40 is provided with a clearance hole 48 which is receptive of the distal end portion of the threaded shaft 38 and permits the member 40 to freely pivot with respect to the shaft 38. The first engaging member 40 is positioned between first and second lock nuts 50 and 52, respectively, which are threadably received on the distal end of the shaft 38, such that the member 40 is rotatably secured at the desired axial position on the shaft 38.

Figure 1:
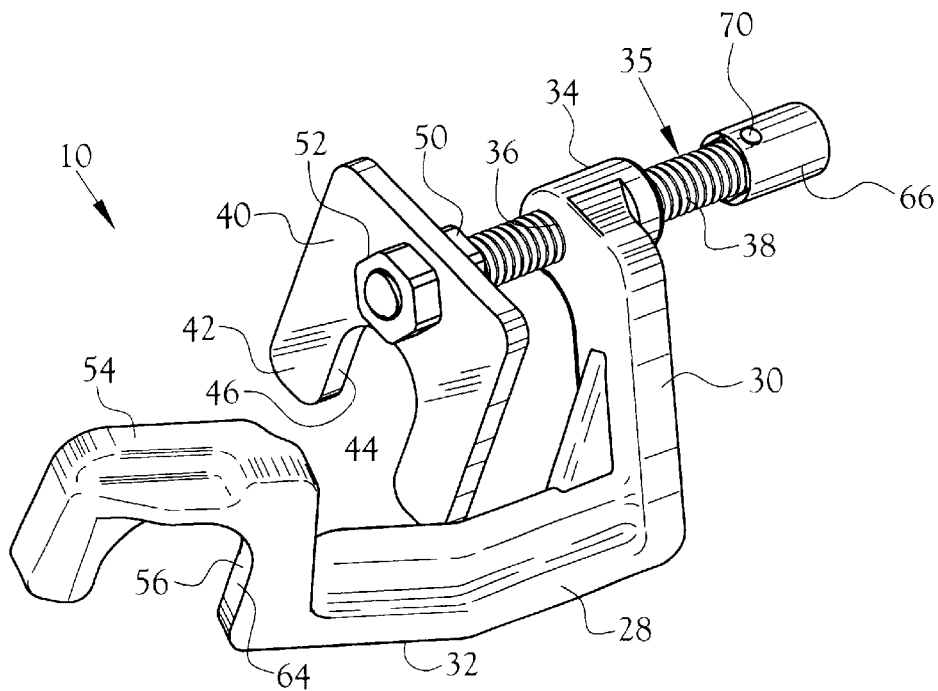
FIG. 1 illustrates a perspective view of a disconnect/reconnect tool of the present invention.
Figure 2:
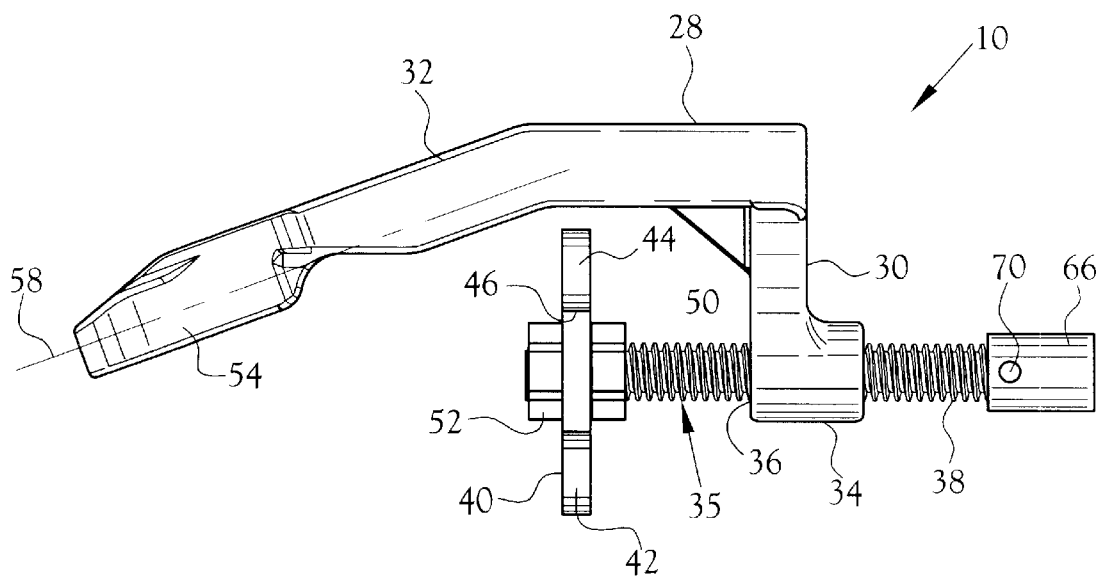
FIG. 2 illustrates a side elevation view of a disconnect/reconnect tool of the present invention.

The second leg portion 32 of the body 28 defines a second engaging member 54 for releasably engaging the second coupling component 16. In the preferred embodiment of the tool 10, the second engaging member 54 defines a slot 56 which is releasably receptive of the second coupling component 16. As best illustrated in FIGS. 2 and 4, in the preferred embodiment of the tool 10 the slot 56 is angularly disposed to engage the second coupling component 16 proximate the point of swivel engagement of the valve housing 22 and elbow portion 24 of the second coupling component 16. In the preferred embodiment the slot 56 is disposed in a plane 58 which is angularly oriented relative to the slot 46 of the first engaging member 40 such that the when the first and second engaging members 40 and 54 engage the coupling 12, the plane 58 of the slot 56 is substantially perpendicular to the rotational axis 60 (see FIG. 4) of the swivel mechanism connecting the valve housing 22 and the elbow portion 24 of the coupling 12.

As illustrated in FIGS. 4 and 5, in order to disconnect a coupling using the disconnect/reconnect tool 10 the first engaging member 40 is positioned such that at least a portion of the first coupling component 14 is received in the slot 46. In this regard, in the preferred operation of the tool 10, the engaging member 40 is positioned such that it is capable of abutting the hose fitting 62 of the hose 18. Further, the second engaging member 54 is positioned such that at least a portion of the second coupling component 16 is received in the slot 56. As noted above, the second engaging member 54 preferably engages the second coupling component 16 proximate the point at which the valve housing 22 and the elbow portion 24 rotatably engage. With the tool 10 so positioned, selective rotation of the threaded shaft 38 in a first rotational direction brings the first engaging member 40 into contact with the hose fitting 62 and the sidewall 64 of the slot 56 into contact with the coupling component 16, and exerts a disengaging force on the coupling 12. When such selected rotation of the threaded shaft 38 exerts force on the coupling which exceeds the preselected disengaging force of the coupling 12, the coupling components 14 and 16 will disconnect.

In order to use the tool 10 to reconnect the coupling 12, the coupling components 14 and 16 are aligned for reconnecting as illustrated in FIG. 5, and the tool 10 is positioned as described above with respect to the disconnect operation and as is also illustrated in FIG. 5. With the tool 10 so positioned, selective rotation of the threaded shaft 38 in a second rotational direction brings the first engaging member 40 into contact with the coupling component 14, the sidewall 64 of the slot 56 into contact with the coupling component 16, and exerts a reconnecting force on the coupling 12. When such selected rotation of the threaded shaft 38 exerts force on the coupling 12 which exceeds the preselected force necessary for reconnecting the coupling, the coupling components 14 and 16 will reconnect.

It will be recognized that the angular disposition of the slot 56 facilitates the engagement of the second engaging member 54 with the second coupling component 16 proximate the junction of the valve housing 22 and the elbow portion 24. It is contemplated that the second engagement member 54 can be disposed to engage the elbow portion 24 closer to the point at which it releasably engages a dispensing device, or disposed for abutting engagement with the dispensing device to which the elbow portion 24 is connected. However, engagement of the second coupling component 16 proximate the valve housing 22 places the point of engagement closer to the axis of separation of the first and second coupling members 14 and 16 such that the tool 10 more efficiently applies disconnecting or reconnecting force to the breakaway coupling 12. It is also contemplated that the second engagement member 54 can be disposed to engage the valve housing 22 closer to the point at which the second coupling component 16 engages the first coupling component 14.

Figure 6:
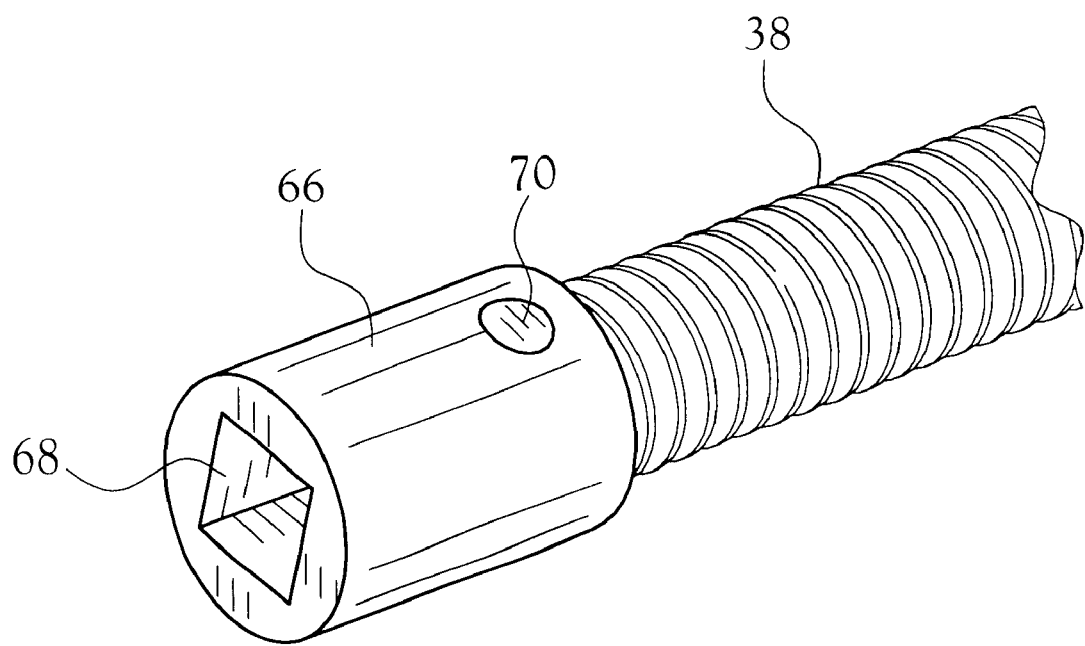
FIG. 6 illustrates a perspective view of one preferred drive mechanism for a disconnect/reconnect tool of the present invention.

Further, in order to effect the desired rotation of the threaded shaft 38, in the preferred embodiment the distal end portion of the shaft 38 is provided with a socket member 66 defining a recess 68. (See FIG. 6) The recess 68 is releasably receptive of the drive stem of a socket wrench (not shown), such that the wrench can be used to rotate the shaft 38. It will also be noted that in the preferred embodiment the socket member 66 is releasably secured to the distal end of the shaft 38 with a pin 70 which is dimensioned for force-fit reception in openings 72 and 74 in the socket member 66 and an opening 76 in the shaft 38. However, other suitable means could be used to fasten the socket member 66 to the shaft 38, such as welding, threading, crimping, or the like. Further, it is contemplated that the shaft 38 can alternatively be provided with various drive mechanism or handles for rotating the shaft 38, and the socket member 66 is merely one preferred drive mechanism.

From the foregoing description, it will be recognized by those skilled in the art that a disconnect/reconnect tool offering advantages over the prior art has been provided. Specifically, the disconnect/reconnect tool 10 provides a tool for selectively disconnecting and reconnecting the coupling components of a hose coupling which is easy to use.

While a preferred embodiment of the disconnect/reconnect tool of the present invention has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A disconnect/reconnect tool for selectively disconnecting and reconnecting the coupling components of a hose coupling, the hose coupling including first and second coupling components which are maintainable in an engaged position in absence of a disengaging force in excess of a preselected value being applied to the coupling, and which disengage in response to a disengaging force in excess of such preselected value being applied to the hose coupling, said tool comprising:

a body provided with a threaded bore;

a threaded shaft for being threadably received in said threaded bore, said threaded shaft defining a proximal end portion;

a first engaging member secured to said proximal end portion of said threaded shaft for releasably engaging the first coupling component;

a second engaging member carried by said body for releasably engaging the second coupling component of the hose coupling, whereby selective rotation of said threaded shaft in a first rotational direction applies disengaging force in excess of the preselected value on the first and second coupling components thereby disconnecting the first and second couplings.

2. The disconnect/reconnect tool of claim 1 wherein said threaded shaft is rotatable in a second rotational direction to apply engaging force sufficient to reconnect the first and second coupling components of the hose coupling.

3. The disconnect/reconnect tool of claim 1 wherein said second engaging member defines a slot for releasably receiving at least a portion of the second coupling component.

4. The disconnect/reconnect tool of claim 2 wherein said second engaging member defines a slot for releasably receiving at least a portion of the second coupling component.

5. A disconnect/reconnect tool for selectively disconnecting and reconnecting the coupling components of a hose coupling, the hose coupling including first and second coupling components which are maintainable in an engaged position in absence of a disengaging force in excess of a preselected value being applied to the coupling, and which disengage in response to a disengaging force in excess of such preselected value being applied to the hose coupling, said tool comprising:

a body provided with a threaded bore;

a threaded shaft for being threadably received in said threaded bore, said threaded shaft defining a proximal end portion;

a first engaging member secured to said proximal end portion of said threaded shaft for releasably engaging the first coupling component;

a second engaging member carried by said body for releasably engaging the second coupling component of the hose coupling, whereby selective rotation of said threaded shaft in a first rotational direction applies disengaging force in excess of the preselected value on the first and second coupling components thereby disconnecting the first and second couplings; wherein said second engaging member defines a slot for releasably receiving at least a portion of the second coupling component, wherein the second coupling component of the hose coupling includes a valve housing, an elbow portion, and a swivel connecting mechanism pivotally securing the elbow portion to the valve housing, whereby the elbow portion selectively swivels about a first rotational axis with respect to the valve housing; and wherein the slot of the second engaging member is angularly disposed in a first plane which is substantially perpendicular to the first rotational axis of the elbow portion of the hose coupling as said first and second engaging members releasably engage the hose coupling.

6. The disconnect/reconnect tool of claim 5, wherein the first coupling component of the hose coupling defines a longitudinal axis which is angularly disposed relative to the first rotational axis of the elbow portion, and wherein said first engaging member defines a slot for releasably engaging the first coupling component, said slot of said first engaging member being disposed in a plane substantially perpendicular to the longitudinal axis of the first coupling component as said first and second engaging members releasably engage the hose coupling.

7. The disconnect/reconnect tool of claim 3, wherein the second coupling component of the hose coupling includes a valve housing and an elbow portion, and a swivel connecting mechanism pivotally securing the elbow portion to the valve housing, whereby the elbow portion selectively swivels about a first rotational axis with respect to the valve housing; and wherein said first engaging member defines a slot for releasably engaging the first coupling component, said slot of said first engaging member being disposed in a first plane, and said slot of said second to engaging member being disposed in a second plane which is angularly dispose with respect to said first plane of said slot of said first engaging member.

8. The disconnect/reconnect tool of claim 7, wherein said threaded shaft is rotatable in a second rotational direction to apply engaging force sufficient to reconnect the first and second coupling components of the hose coupling.

9. The disconnect/reconnect tool of claim 1 wherein said threaded shaft defines a distal end portion which carries a socket member provided with a recess releasably receptive of a drive tool for selectively rotating said threaded shaft.

10. A disconnect/reconnect tool for selectively disconnecting and reconnecting the coupling components of a hose coupling, the hose coupling including a first coupling component defining a longitudinal axis, and a second coupling component, the first and second coupling components being maintainable in a engaged position in absence of a disengaging force in excess of a preselected value being applied to the coupling, and being subject to disengagement in response to a disengaging force in excess of such preselected value being applied to the coupling, said tool comprising:

a body;

an axially reciprocating actuator supported by said body, including a first engaging member for releasably engaging the first coupling component, whereby said axially reciprocating actuator moves along a single axis substantially parallel to the longitudinal axis of the first coupling component, said first engaging member defining a slot for receiving at least a portion of the first coupling component, said slot of said first coupling component being disposed in a first plane substantially perpendicular to the longitudinal axis of the first coupling component, a second engaging member carried by said body for releasably engaging the second coupling component of the hose coupling, said second engaging member defining a slot for releasably receiving at least a portion of the second coupling component, said slot of said second engaging member being disposed in a second plane which is angularly disposed with respect to said first plane of said slot of said first engaging member to facilitate engagement of the second coupling component, whereby selective movement of said axially reciprocating actuator in a first direction applies disengaging force in excess of the preselected value on the first and second coupling components thereby disconnecting the first and second couplings.

11. The disconnect/reconnect tool of claim 10 wherein said body defines a threaded bore, and wherein said axially reciprocating actuator includes a threaded shaft for being threadably received in said threaded bore, whereby selective rotation of said threaded shaft in a first rotational direction applies disengaging force in excess of the preselected value on the first and second coupling components thereby disconnecting the first and second couplings.

12. The disconnect/reconnect tool of claim 11 wherein said threaded shaft is rotatable in a second rotational direction to apply engaging force sufficient to reconnect the first and second coupling components of the hose coupling.

13. The disconnect/reconnect tool of claim 12 wherein said treaded shaft defines a distal end portion which carries a socket member provided with a recess releasably receptive of a drive tool for selectively rotating said threaded shaft.

14. A disconnect/reconnect tool for selectively disconnecting and reconnecting the coupling components of a hose coupling, the hose coupling including a first coupling component defining a longitudinal axis, and a second coupling component, the first and second coupling components being maintainable in a engaged position in absence of a disengaging force in excess of a preselected value being applied to the coupling, and being subject to disengagement in response to a disengaging force in excess of such preselected value being applied to the coupling, said tool comprising:

a body;

an axially reciprocating actuator supported by said body, including a first engaging member for releasably engaging the first coupling component, whereby said axially reciprocating actuator moves along a single axis substantially parallel to the longitudinal axis of the first coupling component, said first engaging member defining a slot for receiving at least a portion of the first coupling component, said slot of said first coupling component being disposed in a first plane;

a second engaging member carried by said body for releasably engaging the second coupling component of the hose coupling, said second engaging member defining a slot for releasably receiving at least a portion of the second coupling component, said slot of said second engaging member being disposed in a second plane which is angularly disposed with respect to said first plane of said slot of said first engaging member to facilitate engagement of the second coupling component, whereby selective movement of said axially reciprocating actuator in a first direction applies disengaging force in excess of the preselected value on the first and second coupling components thereby disconnecting the first and second couplings.

15. A disconnect/reconnect tool for selectively disconnecting and reconnecting the coupling components of a breakaway hose coupling, the breakaway hose coupling including a first coupling component defining a longitudinal axis, and a second coupling component, the first and second coupling components being maintainable in a engaged position in absence of a disengaging force in excess of a preselected value being applied to the breakaway hose coupling, and being subject to disengagement in response to a disengaging force in excess of a preselected value being applied to the breakaway hose coupling, the second coupling component of the hose coupling including a valve housing and an elbow portion, and a swivel connecting mechanism pivotally securing the elbow portion to the valve housing, whereby the elbow portion selectively swivels about a first rotational axis with respect to the valve housing, said tool comprising:

a body defining first and second leg portions, with said first leg portion defining a distal end portion provided with a threaded bore;

an axially reciprocating actuator mechanism, said actuator mechanism including a threaded shaft which is capable of reciprocating axial movement within the threaded bore as a result of selective rotation of said threaded shaft, and including a first engaging member mounted on a distal end portion of said threaded shaft for releasably engaging the first coupling component, the first engaging member defining a slot for releasably receiving at least a portion of said first coupling component;

a second engaging member carried by said second leg portion of said body for releasably engaging the second coupling component, said second engaging member defining a slot which is releasably receptive of at least a portion of the second coupling component, whereby selective rotation of said threaded shaft in a first rotational direction applies disengaging force in excess of the preselected value on the first and second coupling components thereby disconnecting the first and second couplings, and wherein said threaded shaft is rotatable in a second rotational direction to apply engaging force sufficient to reconnect the first and second coupling components of the breakaway hose coupling.

16. The disconnect/reconnect tool of claim 5 wherein said threaded shaft is rotatable in a second rotational direction to apply engaging force sufficient to reconnect the first and second coupling components of the hose coupling.

17. The disconnect/reconnect tool of claim 5 wherein said second engaging member defines a slot for releasably receiving at least a portion of the second coupling component.

* * * * *